US007136805B2

(12) United States Patent
Wang

(10) Patent No.: US 7,136,805 B2
(45) Date of Patent: Nov. 14, 2006

(54) SYSTEM FOR DISTINGUISHING NAMES OF ORGANIZATIONS IN ASIAN WRITING SYSTEMS

(75) Inventor: Xinkai Wang, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 772 days.

(21) Appl. No.: 10/166,377

(22) Filed: Jun. 11, 2002

(65) Prior Publication Data

US 2003/0229487 A1    Dec. 11, 2003

(51) Int. Cl.
*G06F 17/28* (2006.01)
(52) U.S. Cl. ......................................................... 704/9
(58) Field of Classification Search .................... 704/4, 704/7–8
See application file for complete search history.

(56) References Cited

U.S. PATENT DOCUMENTS

| | | | | |
|---|---|---|---|---|
| 6,173,252 | B1 * | 1/2001 | Qiu et al. ...................... | 704/9 |
| 6,311,152 | B1 * | 10/2001 | Bai et al. ...................... | 704/9 |
| 6,697,801 | B1 * | 2/2004 | Eldredge et al. .............. | 707/6 |
| 2003/0229487 | A1 * | 12/2003 | Wang ............................ | 704/4 |
| 2003/0229634 | A1 * | 12/2003 | Li ................................. | 707/4 |

FOREIGN PATENT DOCUMENTS

WO    WO 00/04459    1/2000

OTHER PUBLICATIONS

Chen et al., "Word Identification for Mandarin Chinese Sentences," Proceedings of the International Conference on Computational Linguistics, vol. I, pp. 101-107, 1992.*
Nam et al., "A Local Grammar-based Approach to Recognising of Proper Names in Korean Text," CAIR, Proceedings of Fifth Workshop on Very Large Corpora, pp. 273-288, 1997.*

* cited by examiner

*Primary Examiner*—Susan McFadden
(74) *Attorney, Agent, or Firm*—Oliff & Berridge, PLC

(57) ABSTRACT

A system for distinguishing names of organizations in Chinese text, which includes a computer. The computer has at least an input, an output, a processor, and a memory and storage arrangement. Data is accessible by the processor that includes at least two groups of terms that frequently respectively form the first and last terms of the names of organizations in Chinese. The system includes software, which when performed by the computer causes computer processing including identifying terms in Chinese text that has been input to the computer for terms corresponding to those in the groups in the data; comparing the location in the Chinese text of each identified term from one of the groups to identified terms from the other group, and if predefined conditions are met, determining that the identified term from one group forms the name of an organization with an identified term from the other group.

21 Claims, 17 Drawing Sheets

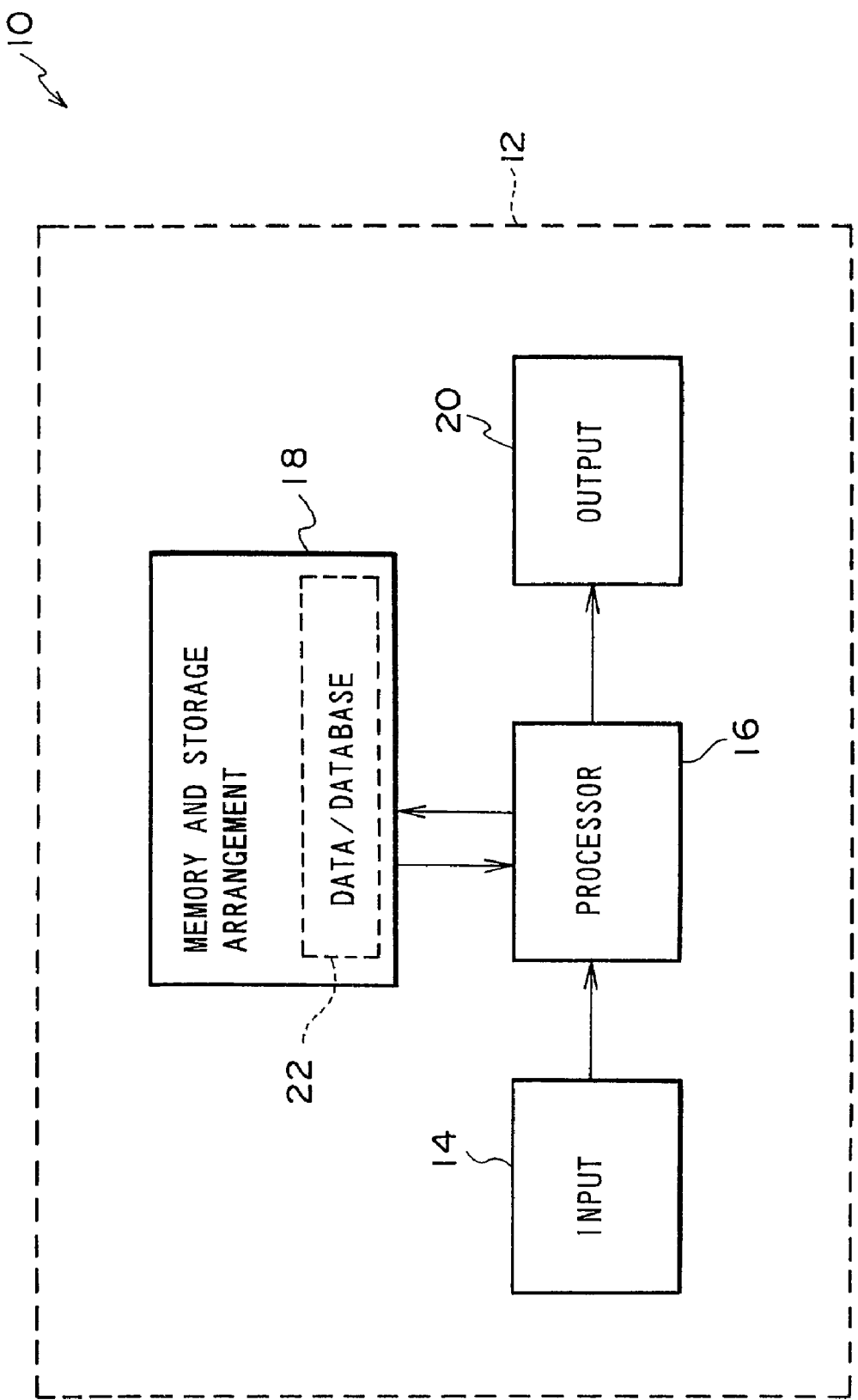

FIG. 2A

| SUFFIX | TRANSLATION |
|---|---|
| TABLE 1 | |
| 研究院 | INSTITUTE/LABORATORY/RESEACH CENTER |
| 研究所 | INSTITUTE/LABORATORY |
| 研究局 | INSTITUTE/LABORATORY |
| 实验室 | LABORATORY |
| 室 | ROOM |
| 教研室 | EDUCATIONAL INSTITUTION |
| 州立大学 | STATE UNIVERSITY |
| 大学 | UNIVERSITY/COLLEGE |
| 系 | DEPARTMENT |
| 学系 | DEPARTMENT |
| 中心 | CENTER |
| 所 | ROOM/PLACE |
| 学院 | COLLEGE |
| 院 | COLLEGE/INSTITUTE/HOSPITAL/CINEMA |
| 组织 | ORGANIZATION |
| 大专 | UNIVERSITY AND COLLEGE |
| 校 | SCHOOL |
| 党校 | SCHOOLS OF THE COMMUNIST PARTY |

EXAMPLES OF SUFFIXES FOR NAMES OF ORGANIZATIONS IN CHINESE

FIG. 2B

| EXAMPLES OF SUFFIXES FOR NAMES OF ORGANIZATIONS IN CHINESE ||
|---|---|
| SUFFIX | TRANSLATION |
| 高中 | HIGH SCHOOL |
| 职高 | VOCATIONAL SCHOOL |
| 职业高中 | VOCATIONAL SCHOOL |
| 中专 | VOCATIONAL HIGH SCHOOL |
| 初中 | JUNIOR HIGH SCHOOL |
| 小学 | ELEMENTARY SCHOOL |
| 中学 | JUNIOR HIGH AND HIGH SCHOOLS |
| 幼儿园 | KINDERGARTEN |
| 托儿所 | DAY CARE CENTER (FOR CHILDREN) |
| 公司 | COMPANY/FIRM |
| 宾馆 | HOTEL |
| 集团 | GROUP |
| 有限公司 | LIMITED COMPANY |
| 基金 | FUND |
| 店 | STORE/SHOP |
| 厂 | FACTORY/PLANT |
| 化工厂 | CHEMICAL PLANT |

FIG. 2C

| EXAMPLES OF SUFFIXES FOR NAMES OF PROPER NOUN TRANSLATOR ||
|---|---|
| SUFFIX | TRANSLATION |
| 商城 | SUPERMARKET/DEPARTMENT STORE |
| 股份公司 | CORPORATION/JOINT STOCK COMPANY |
| 股份有限公司 | CORPORATION/JOINT STOCK COMPANY |
| 医院 | HOSPITAL |
| 银行 | BANK |
| 快餐店 | FAST FOOD |
| 拍卖行 | AUCTION COMPANY |
| 网 | NETWORK |
| 网站 | NETWORK STATION |
| 站 | STATION/CENTER |
| 电视台 | TV STATION |
| 台 | STATION/CENTER |
| 报 | NEWSPAPER |
| 晚报 | EVENING NEWSPAPER |
| 社 | COMPANY |
| 通讯社 | NEWS AGENCY/PRESS BUREAU |
| 新華社 | NEW CHINA NEWS AGENCY [NCNA] |

FIG. 2D

| EXAMPLES OF SUFFIXES FOR NAMES OF ORGANIZATIONS IN CHINESE ||
|---|---|
| SUFFIX | TRANSLATION |
| 部 | DEPARTMENT/SECTION |
| 委 | COMMITTEE |
| 委員会 | COMMITTEE |
| 机构 | ORGANIZATION |
| 局 | AGENCY/BUREAU/OFFICE |
| 厅 | AGENCY/BUREAU/OFFICE |
| 处 | AGENCY/BUREAU/OFFICE |
| 科 | DEPARTMENT/SECTION |
| 股 | SECTION/SUBSECTION |
| 组 | GROUP/TEAM |
| 部门 | DEPARTMENT/SECTION |
| 署 | STATION/ADMINISTRATIVE INSTITUTION |
| 政治局 | POLITICAL BUREAU |
| 国务院 | STATE COUNCIL |
| 理事会 | BOARD OF DIRECTORS |
| 公安局 | BUREAU OF PUBLIC SAFETY |

FIG. 2E

| EXAMPLES OF SUFFIXES FOR NAMES OF ORGANIZATIONS IN CHINESE ||
|---|---|
| SUFFIX | TRANSLATION |
| 村政府 | VILLAGE ⎫ |
| 乡政府 |  |
| 镇政府 |  |
| 区政府 | ⎬ LOCAL GOVERNMENT |
| 县政府 |  |
| 县委 |  |
| 市政府 | CITY ⎭ |
| 省政府 |  |
| 办事处 | OFFICE |
| 办 | OFFICE |
| 中央 | CENTRAL GOVERNMENT |
| 会 | INSTITUTE/SOCIETY |
| 党委 | COMMITTEE OF THE COMMUNIST PARTY |

FIG. 2F

| EXAMPLES OF SUFFIXES FOR NAMES OF ORGANIZATIONS IN CHINESE ||
|---|---|
| SUFFIX | TRANSLATION |
| 地区 | DISTRICT |
| 公社 | GOVERNMENT ORGANIZATION |
| 庄 | ADMINISTRATIVE UNIT |
| 村 | |
| 乡 | |
| 镇 | |
| 区 | |
| 县 | |
| 市 | |
| 省 | |
| 联邦 | FEDERATION OF STATES |
| 市 | CITY/BOROUGH |
| 中心 | CENTER |
| 岛 | ISLAND |
| 江 | RIVER |
| 河 | RIVER |
| 湖 | LAKE |
| 海 | OCEAN |

FIG. 2G

| EXAMPLES OF SUFFIXES FOR NAMES OF ORGANIZATIONS IN CHINESE ||
|---|---|
| SUFFIX | TRANSLATION |
| 山 | MOUNTAIN |
| 洞 | CAVE |
| 坝 | DAM |
| 峰 | RIDGE/PEAK |
| 滩 | OPEN SEA |
| 潭 | ABYSS |
| 沟 | FRENCH |
| 场 | FIELD |
| 部队 | TROOP |
| 空降兵 | PARACHUTIST |
| 军 | ARMY |
| 兵 | SOLDIER |

FIG. 3

| EXAMPLES OF PROPER NOUNS ||
|---|---|
| PROPER NOUN | TRANSLATION |
| 新墨西哥州 | NEW MEXICO STATE |
| 中国 | CHINA |
| 广西 | GUANG XI PROVINCE |
| 北大 | PEKING UNIVERSITY (ABBREVIATION) |

FIG. 4A

SOME EXAMPLES OF TEXT THAT DOES NOT ORDINARILY FORM THE NAME OF AN ORGANIZATION IN CHINESE

| CATEGORY OF TEXT | EXAMPLES |
|---|---|
| POSSESSIVE INDICATORS FOR NOUNS | 的 |
| POSSESSIVE INDICATORS FOR VERBS, ADVERBS, OR ADJECTIVES | 地, 得 |
| PRONOUNS | 我 他们 这 哪 什么 本 该<br>I, THEY, THIS, WHERE, WHAT, THIS, THIS |
| COUNTERS | 张 篇 个 家 口 车两<br>PIECE, PIECE, PIECE, FAMILY MEMBERS, POPULATION, VEHICLES |
| TERMS FOR TIME | 年 月 日 十 一 前天<br>YEAR, MONTH, DAY, TENTH, FIRST, DAY BEFORE YESTERDAY |
| AUXILLIARY VERBS | 应该 愿 会 可能 能<br>SHOULD, HOPE, CAN, POSSIBLE, CAN |
| PREPOSITOUS | 在 以 所 被 把 于 从<br>IN OR OF, BY, NEAR, BY, WITH OR BY, IN OR AT, FROM |

FIG. 4B

SOME EXAMPLES OF TEXT THAT DOES NOT ORDINARILY FORM THE NAME OF AN ORGANIZATION IN CHINESE

| CATEGORY OF TEXT | EXAMPLES |
|---|---|
| ASPECT MARKERS | 过 了<br>(PAST TENSE INDICATORS) |
| CONJUNCTIONS FOR NOUNS | 与 和 同<br>AND OR/WITH, AND, AND |
| CONJUNCTIONS FOR NON-NOUNS | 并 且 但<br>AND, AND, BUT |
| COUNTERS COMBINED WITH NUMBERS AND/OR NOUNS | 一家, 两个 数十记者 TENS OF REPORTERS<br>ONE FAMILY TWO(OF)<br>第一届 ５０％股权 50% STOCK OWNERSHIP<br>FIRST TIME, |
| TITLES FOR PERSONS | 先生 夫人 副校长 总理 MANAGER<br>Mr. Mrs.OR Ms. VICE-PRINCIPAL<br>局长 书记<br>DIRECTOR DIRECTOR |

FIG. 5

| CHINESE | TRANSLATION |
|---|---|
| 设立 | CREATE/ESTABLISHMENT |
| 到达 | ARRIVE |
| 办理 | PROCESS |
| 组建 | CONSTRUCT/ORGANIZE |
| 唯一 | ONLY |
| 找到 | FIND OUT |
| 俄 | RUSSIA OR SOON |

SPECIAL CASES OF TERMS THAT DO NOT USUALLY FORM THE NAMES OF ORGANIZATORS IN CHINESE

FIG. 6

| EXAMPLE 1 |||
|---|---|---|
| CHINESE: 华润创业10月9日宣布与四川蓝剑啤酒集团共组合资公司。 |||
| TRANSLATION:<br>ON OCT. 9th, HUA REN CUNANG YE ANNOUNCED THAT THEY HAD SET UP A JOINT-VENTURE COMPANY WITH SICHUAN BLUE SWORD BEER GROUP. |||
| KANJI | PRONUNCIATION | MEANING |
| 华 | HUA | CHINA |
| 润 | RUN | SMOOTH |
| 创业 | CHUANG YE | MAKE ONE'S CAREER |
| 10月 | SHI YUE | OCTOBER |
| 9日 | JIU RI | NINTH |
| 宣布 | XUAN BU | ANNOUNCE |
| 与 | YU | AND OR WITH |
| 四川 | SI CHUAN | SICHUAN PROVINCE OF CHINA |
| 蓝 | LAN | BLUE |
| 剑啤酒 | JIAN PI JIU | SWORD BEER |
| 集团 | JI TUAN | GROUP |
| 共组 | GONG ZU | CREATE SOMETHING TOGETHER |
| 合资 | HE ZHI | JOINT VENTURE |
| 公司 | GONG SI | COMPANY |

FIG. 7

| EXAMPLE 2 | | |
|---|---|---|
| CHINESE: 翁富良、斯坦福国际研究所语音技术和研究实验室研究工程师。 | | |
| TRANSLATION:<br>WENG FULIANG, IS A RESEARCH ENGINEER AT THE SPEECH TECHNOLOGY AND RESEARCH LABORATORY OF STANFORD INTERNATIONAL INSTITUTE. | | |
| KANJI | PRONUNCIATION | MEANING |
| 翁 | WENG | FAMILY NAME OR AN OLD MAN |
| 富 | FU | FAMILY NAME OR RICH |
| 良 | LIANG | GOOD |
| 斯坦福 | SI TAN FU | STANFORD |
| 国际 | GUO JI | INTERNATIONAL |
| 研究所 | YAN JIU SUO | INSTITUTE |
| 语音 | YU YIN | SPEECH |
| 技术 | JI SHU | TECHNOLOGY |
| 和 | HE | AND |
| 研究 | YAN JIU | RESEARCH |
| 实验室 | SHI YAN SHI | LABORATORY |
| 研究 | YAN JIU | RESEARCH |
| 工程师 | GONG CHENG SHI | ENGINEER |

FIG. 8A

| SOME EXAMPLES OF NOUN PHRASES ||
| --- | --- |
| CHINESE | TRANSLATION |
| 国际 | INTERNATIONAL |
| 秘书 | SECRETARY |
| 财产 | PROPERTY/FORTUNE |
| 债券 | DEBENTURE/BOND |
| 剑牌酒 | LIQUOR OF SWORD BRAND (PROPER NAME) |
| 医科 | MEDICAL |
| 证券 | SECURITIES/BOND |
| 证 | CONFIRMATION/EVIDENCE |
| 精神 | SPIRIT |
| 特种 | SPECIAL |
| 民族权力 | POWER OF NATION |
| 国际大厦实业 | INTERNATIONAL BUILDING BUSINESS |
| 国 | STATE/COUNTRY |
| 景 | SIGHT/LANDSCAPE |
| 航天 | ASTROGATION/SPACE FLIGHT |
| 飞机 | AIRPLANE |
| 国际 | INTERNATIONAL |
| 语言 | LANGUAGE |

FIG. 8B

| SOME EXAMPLES OF NOUN PHRASES ||
|---|---|
| CHINESE | TRANSLATION |
| 技术 | TECHNIQUE/ENGINEERING |
| 大厦 | BUILDING |
| 龙企业 | DRAGON BUSINESS |
| 基地 | BASE/CAMP |

FIG.9

| EXAMPLE 3 |||
|---|---|---|
| CHINESE: 雀巢(中国)有限公司董事长兼行政总裁穆立当时说, |||
| TRANSLATION:<br>AT THAT TIME, THE BOARD CHAIRMAN AND ADMINISTRATIONAL PRESIDENT OF NESCAFE(CHINA)CO. LTD. MU LI, SAID THAT··· |||
| KANJI | PRONUNCIATION | MEANING |
| 雀巢 | QUE CHAO | NES CAFE |
| ( | — | PARENTHESIS |
| 中国 | ZHONG GUO | CHINA |
| ) | — | PARENTHESIS |
| 有限公司 | YOU XIAN GONG SI | CO. LTD. |
| 董事长 | DONG SI ZHANG | THE BOARD CHAIRMAN |
| 兼 | JIAN | AND |
| 行政 | XING ZHENG | ADMINISTRATIONAL |
| 总裁 | ZONG CAI | PRESIDENT |
| 穆 | MU | FAMILY NAME |
| 立 | LI | STAND UP |
| 当时 | DANG SHI | AT THAT TIME |
| 说 | SHUO | SAY |

SYSTEM FOR DISTINGUISHING NAMES OF ORGANIZATIONS IN ASIAN WRITING SYSTEMS

CROSS-REFERENCE TO RELATED APPLICATIONS

Not applicable.

Statement Regarding Federally Sponsored Research Development

Not applicable.

FIELD OF THE INVENTION

The present invention relates generally to systems for distinguishing names in text from other words, and more particularly to systems for distinguishing names of organizations in text in Asian writing systems from other words.

BACKGROUND OF THE INVENTION

Asian writing systems, such as that used in China, are substantially different from writing systems developed in other parts of the world. In writing systems for most Western languages, characters are employed to represent sounds in spoken words. With relatively few characters, the characters can be arranged in many different combinations to represent the thousands of sound combinations used in speech.

In contrast, in the Chinese writing system, characters typically do not represent individual sounds in spoken words. Rather, the character represents an idea or concept. Consequently in the Chinese writing system, thousands of different characters have been developed corresponding to thousands of different concepts. In general, the Chinese writing seems to be much more complex than that used in most Western countries because a much greater number of characters form the Chinese writing system.

Further complicating the Chinese writing system is that the characters are combined into sentences with essentially no variation in spacing between characters. While a single Chinese character may correspond to an entire word, often two or more characters together correspond to a word. Hence, it can be difficult to distinguish individual words from one another in a sentence written in Chinese because there is little to indicate where one word ends and another begins, i.e., there is no spacing between words. Punctuation can be relied on as delimiter between words, such as periods or commas, as well as words customarily written in English and appearing in a sentence otherwise formed of Chinese characters. Frequently, though, there will be no delimiter between one word and the next within a sentence written in Chinese.

In this respect, Chinese can be more problematic than Japanese. The Japanese system initially seems to appear more complex than Chinese, in that the Japanese writing system employs three character sets: (1) kanji; (2) hiragana; and (3) katakana. In addition, some words are commonly written in English in Japanese.

In Japanese, the kanji characters are based in substantial part on the Chinese writing system. Specifically, many kanji characters used in the Japanese writing system are similar or substantially identical to Chinese characters for representing corresponding concepts, although pronunciation is often completely different. In Japanese therefore, as in Chinese, such characters typically do not represent individual sounds in spoken words. Hence, the Japanese writing system is complex in that it is formed of thousands of different characters.

In written Japanese, as in Chinese, sentences have essentially no variation in spacing between characters forming the sentence, i.e., there is no spacing between words. Notwithstanding, it is usually easier to distinguish one word from another in a written Japanese sentence because of the other two Japanese character sets, hiragana and katakana.

Hiragana and katakana are both phonetic alphabets. Specially, both employ a set of characters representing sounds in spoken words. Katakana is generally used in the Japanese writing system to spell words from foreign languages used in Japanese. Hiragana is used for, among other things, words of Japanese origin for which there is no kanji character, as subject or object markers, showing location such as at, in, by and etc, for showing possessive states, and indicating tenses. In a written Japanese sentence, hiragana and/or katakana characters often separate words in kanji characters from one another, thereby making it easier to distinguish one word from another relative to a comparable sentence in Chinese.

For example, to write the child's dog in Japanese, a hiragana character indicating possession will appear between the kanji characters for child and dog. Thus, relative to Chinese, it is easier in Japanese to distinguish words from one another due to characters from the Japanese phonetic character sets appearing in sentences in the Japanese writing system.

Difficulties have been encountered in developing information systems capable of accurately processing articles or text in Asian writing systems, such as Chinese, Japanese, Korean, and etc. While difficulties may not be as problematic with some Asian writing systems, such as Japanese, difficulties have arisen in general with such Asian writing systems.

One difficulty in particular has been in developing an information processing system capable of accurately distinguishing names of persons or organizations in Chinese from surrounding textual material. Such processing would be useful for instance, such as in information retrieval for searching articles for keywords or pertinent phrases to locate articles relevant to a particular subject and/or for indexing articles for future document retrieval. For example, someone may wish to locate and/or index articles concerning a particular Chinese organization. In addition, such processing would be useful for more accurate computer translation of Asian text into another language, such as English.

BRIEF SUMMARY OF THE INVENTION

The present invention provides a system for distinguishing names of organizations in Chinese text. The system includes a computer for receiving Chinese text in electronic format. The computer includes at least an input, an output for outputting results, a processor for processing instructions and data, and a memory and storage arrangement for storing instructions and data.

The system includes data accessible by the processor. The data includes at least one group of terms including terms frequently forming the first terms of names of organizations, and another group of terms comprising terms frequently used to form the last terms of the names of organizations in Chinese.

The system further includes software installed on the computer. The software when performed by the computer causes the processor to perform processing, which includes identifying terms in Chinese text that has been input to the computer for terms corresponding to those in the groups in the data. The processing further includes comparing the location in the Chinese text of each identified term from the another group to identified terms from the one group and if predefined conditions are met, determining that the identified term from the another group forms the name of an organization with an identified term from the one group. In addition the processing includes outputting results.

In a further aspect, in the foregoing comparing, one of the predefined conditions is that the identified term corresponding to the another group must appear in the text after an identified term corresponding to the one group. In a still further aspect, in this comparing, each identified term is compared with the location of a different identified term only if both identified terms appear in the same phrase. In a further aspect yet, in the comparing, the predefined conditions include that two terms corresponding to the another group cannot together form the name of an organization. In yet another aspect, the predefined conditions include a plurality of rules applied in sequential order.

In another aspect, the terms included in the one group are proper nouns. Moreover, the processing includes identifying any English text appearing in the Chinese text. In this regard, the processing compares the location of each identified term corresponding to the another group to identified English text and if predefined conditions are met, determines that the identified term corresponding to the another group forms the name of an organization including English text.

In an additional aspect, the processing includes identifying indicators in the text based on the data. The indicators tend to indicate that the term immediately following an identified indicator in the text is the first term of the beginning of the name of an organization and ending with an identified term corresponding to the another group.

In aspects concerning a method or process, the present invention provides a process for distinguishing the name of an organization appearing in a phrase or sentence in Chinese. The process includes establishing data including at least one group of terms comprising indicators that tend to indicate that a term immediately following an indicator is the first term of the name and of an organization, and another group of terms comprising terms frequently used to form the last terms of the names of organizations in Chinese. The process additionally includes identifying in the Chinese phrase or sentence terms corresponding to the data. Further, the processing includes comparing the location in the Chinese text of each identified term from the another group to identified terms from the one group and if predefined conditions are met, determining that the identified term from the another group forms the name of an organization together with text immediately preceding the identified term up to, but not including, an identified term from the one group. In another aspect, the indicators include a comma or a possessive or aspect indicator in Chinese.

In yet another aspect concerning a method or process, the process further includes identifying any English text appearing in the Chinese phrase or sentence, and comparing the location of each identified term corresponding to the another group to identified English text. If predefined conditions are met in the comparison, the process determines that the identified term corresponding to the another group forms the name of an organization including English text.

In still another aspect concerning a process, one of the predefined conditions is that the identified term corresponding to the another group must appear in the text after an identified term corresponding to the one group. In yet another aspect, the predefined conditions include that two terms corresponding to the another group cannot together form the name of an organization.

In other aspects, the process further includes identifying proper nouns in the text and comparing the location in the text of each identified term from the another group to identified proper nouns. If predefined conditions are met in this comparison, the process determines that the identified term from the another group forms the name of an organization with an identified proper noun. In a further aspect, the identification of proper nouns and the comparing the location in the text of each identified term from the another group to identified proper nouns is performed prior to comparing the location in the Chinese text of each identified term from the another group to identified terms from the one group.

In aspects pertaining to a product, the present invention provides a product for distinguishing names of organizations in a phrase or sentence in Chinese input to a computer. The product includes a recording medium having computer readable data and program logic recorded thereon. The computer data includes at least one group of terms comprising proper nouns, and another group of terms comprising terms frequently used to form the last terms of the names of organizations in Chinese. The program logic when executed by the computer, causes the computer to perform processing.

The foregoing processing includes identifying terms in a Chinese phrase or sentence that has been input to the computer for terms corresponding to those in the groups in the data. The processing further includes comparing the location in the Chinese phrase or sentence of each identified term from the another group to identified terms from the one group and if predefined conditions are met, determining that the identified term from the another group forms the name of an organization with an identified term from the one group. The processing also outputs results.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 1 schematically illustrates a system in accordance with a preferred embodiment of the present invention;

FIGS. 2A through 2G illustrate a table showing examples of suffixes for names of organizations in Chinese;

FIG. 3 illustrates a table showing examples of proper nouns in Chinese;

FIGS. 4A and 4B illustrate a table showing examples of text that does not ordinarily form the name of an organization in Chinese;

FIG. 5 illustrates a table showing special cases of terms that do not usually form the names of organizations in Chinese;

FIGS. 6 and 7 illustrate tables showing examples of sentences in Chinese;

FIGS. 8A and 8B illustrate a table showing examples of nouns and noun phrases in Chinese; and FIG. 9 illustrates a table showing an example of a phrase in Chinese.

DETAILED DESCRIPTION OF THE PREFERRED EMBODIMENTS

FIG. 1 schematically illustrates a preferred embodiment of a system 10 in accordance with the present invention. The system 10 is preferably implemented on a computer 12 having a commercially available operating system. During development, a preferred embodiment of the system was implemented on computers having LINUX and WINDOWS operating systems, but other operating systems could be used as well, such as UNIX or operating systems available from APPLE COMPUTER. The computer 12 includes an input 14 for inputting information, a processor 16 for processing instructions and data, and a memory and storage arrangement 18 for storing instructions and data, and an output 20.

The processor 16 may be a central processing unit (CPU) or perhaps a plurality of processors in a computer having a multiple processor arrangement. The memory and storage arrangement 18 would include items such as RAM, ROM, disk drives, such as hard disks and/or floppy disks, electro-optical drives, such as drives for CDs and/or DVDs, and other media for data storage, such as flash memory cards, for example, types such as COMPACT FLASH, SD ("SECURE DIGITAL"), MMC ("MULTIMEDIA CARD"), SMART MEDIA, and etc. Computer program logic, i.e., software would be installed on the computer 12, and stored in the memory and storage arrangement 18 for execution by the processor 16.

Inputting information into the computer 12 includes inputting text in electronic format input into the system 10 through the memory and storage arrangement 18. For example, such as text stored in computer readable format on a floppy disk or other media and read into the system 10 via a disk drive. Alternatively, the text could be downloaded into the system 10 through an Internet connection via a modem or network connection. In addition, if the computer operating system is adapted for keyboard entry of Chinese text, the text could be typed into the system using a keyboard via the computer input 14 or other manual input arrangement. Further, the text could be in printed form and scanned into electronic format for input into the computer 12. Also, speech recognition software could be used for translating spoken or audio Chinese into text format. Through any of the foregoing techniques and/or other presently available technologies, Chinese text in electronic format is input into the computer 12 for processing in accordance with the system 10.

The system 10 preferably works with presently available word segmentation and part-of-speech tagging software. In particular, prior to processing Chinese text, the text is segmented into separate words by word-segmentation software. In addition, the word-segmentation software preferably also notes or tags words in accordance with a lexicon as to which parts-of-speech the words correspond to, such as noun, verb, adjective, adverb, preposition, conjunction, and so forth. After the text has been segmented, the system 10 is employed to identify names of organizations in the text.

In processing the text, the system 10 relies upon some characteristic features to which most Chinese names for organizations conform. One of these characteristic features is that the last word forming the name of most organizations is selected from only a few hundred different words. FIGS. 2A through 2G illustrate a table showing examples from these few hundred words. For instance, the names of many organizations end in the word institute or company.

During development of the system 10, research was performed to establish data 22 for use in distinguishing the names of organizations appearing in Chinese text. For ease and speed in search and retrieval, the data is preferably arranged into a database 22. Preferably the data or database 22 would be stored on a hard disk in the memory and storage arrangement 18. However, the database 22 could reside on a CD other media, or perhaps be accessible on another computer through a network connection.

The database 22 includes the words frequently forming the last word of the names of most organizations in the Chinese language. For convenience of discussion purposes herein, the last word of an organization's name is hereinafter referred to as the suffix. In distinguishing the names of organizations, the system 10 identifies words appearing in text that correspond to one of the organization suffixes in the database 22. From an identified organization suffix the system 10 then attempts to find the first word or term forming the name of an organization possibly appearing in the text.

The word possibly is used because when an organization suffix is identified as appearing in a sentence, it does not necessarily mean that the name of an organization is present. Specifically, the organization suffixes typically have meaning when not used as the name of a particular organization. Hence, the identified organization suffix could be being used in the sentence as an ordinary word. For example, the word company could be being used to generically refer to a company, rather than as in the name of a particular business organization.

In attempting to locate the first term forming the name of an organization corresponding to an organization suffix, the system 10 applies a series of tests or rules. If all of the conditions or requirements of a rule are met for an identified organization suffix, the system 10 determines that it has identified the name of an organization with respect to that identified organization suffix. If there is no rule for which all requirements are met, the system determines that this identified organization suffix is not being used as a name in this context, i.e., that the suffix is being used an ordinary word.

In a preferred embodiment, seven rules were employed which are hereinafter described. In alternative embodiments, more or less rules may be satisfactory. For convenient reference, the rules are referred to herein as Rules 1–7. The rules are preferably applied in the order described herein as this order generally tends to more accurately distinguish organization names. However, in alternative embodiments other orders may be satisfactory.

In that regard, the system 10 first applies Rule 1. Rule 1 requires in the text preceding the identified organization suffix a term that frequently forms the first term of names of organizations. One group of such terms is proper nouns, which are also often referred to as proper names. As an alternative to a proper noun, this condition of Rule 1 will be satisfied if there is English text preceding the identified organization suffix. The purpose here, is to locate a word or term that could form the beginning of the name of an organization. The database 22 further includes words or terms that form the beginning part of the names of many organizations, i.e., proper nouns. FIG. 3 illustrates a table showing some examples of words for identification by the system 10 as proper nouns in accordance with the database 22.

In identifying proper nouns, preferably the system 10 uses a dictionary or lexicon in electronic format with words or terms that are noted or tagged in the dictionary by type, such as proper nouns, verbs, adjectives, and etc. Hence, the system 10 can search for proper nouns in Chinese text corresponding to a particular type of word or term as tagged in the lexicon. Preferably, the lexicon is included with the database 22. In alternative embodiments, a separate database could be established for proper nouns rather than using a dictionary in which words or terms have been tagged by type.

With respect to English text, the names of western organizations are often written partly in English and in Chinese text, especially the beginning part of an organization's name. The system 10 thus also looks for English text preceding an identified organization suffix. The IBM Corporation, for example, is often written in English and in Chinese in text in Chinese. The foregoing condition of Rule 1 is satisfied if any English text is present in the Chinese text preceding an identified organization suffix.

Rule 1 additionally imposes requirements on text, if any, appearing between the possible first term and organization suffix, wherein the possible first term is either a proper noun or English text. In particular, text interposed between the suffix and the possible first term may not be of a type that is usually inconsistent with the name of an organization. In particular, it would be inconsistent for an organization to have more than one suffix. Therefore, Rule 1 requires that no other organization suffix appear before the possible term and another organization suffix.

In addition, generally possessive indicators for nouns and verb do not appear in the name of an organization in Chinese. FIG. 4A illustrates a portion of a table listing examples of possessive indicators that Rule 1 requires to not appear interposed between the suffix and the possible first term.

Further, terms pertaining to time do not typically appear in the name of an organization. The portion of the table illustrated in FIG. 4A also illustrates examples of such terms for time. Accordingly, Rule 1 requires that terms for time do not appear interposed between the suffix and possible first term.

In addition, counter terms would not ordinarily appear in the name of an organization. An example of counter terms in English would be words such as pieces or sheets, as in pieces of cake or sheets of paper. Pieces and sheets are counter terms, of which there are a much greater variety of counter terms in Chinese and Japanese. FIG. 4A further illustrates examples of counter terms used in Chinese. Hence, Rule 1 requires that counter terms do not appear in text interposed between the possible first term and the suffix.

In addition, pronouns do not appear in the names of most organizations. Examples or pronouns, correspond in English to words such as 1, they, this where, what, and this. The portion of the table shown in FIG. 4A additionally lists examples of Chinese words corresponding to pronouns.

Similarly, auxiliary verbs are not present in the names of most organizations. Auxiliary verbs correspond in English to words such as should, can, and may. The portion of the table in FIG. 4A also lists examples of words in Chinese corresponding to auxiliary verbs.

Further, punctuation, such as commas, apostrophes, and quotation marks does not often appear in the name of an organization in Chinese text. Hence, Rule 1 requires that this type of punctuation not appear interposed between the possible first term and the suffix.

In addition, there may be other terms not falling into the above-described categories that may have been identified as not normally forming part of the name of an organization in Chinese. Examples of such words discovered during the development of the system 10 are listed in FIG. 5. Rule 1 also requires that such words or terms not be interposed between the possible first term and the suffix of the name of an organization.

As discussed above, the system 10 is preferably implemented using a database 22 comprising a dictionary or lexicon in electronic format that specifies the type for each term listed therein, such as auxiliary verb, proper noun, pronoun, counter, time phrase, and etc. Hence, software for the system 10 can instruct the computer 12 to search for words appearing in Chinese text corresponding to words of a certain type in the lexicon or database 22. The lexicon may not list some words as proper nouns or other types that are in some cases used as proper names. Hence, Rule 1 also provides for such cases, which the database also includes, for words that should not be interposed between the possible first term and the suffix for an organization.

FIG. 6 illustrates a table having a sentence for an example of the application of Rule 1. The example shows the sentence in Chinese, together with a translation in English in the row below the Chinese sentence. Further, the columns below the English translation show a word-by-word translation from Chinese to English. The example sentence as translated into English is: "On October $9^{th}$, Hua Ren Cunang Ye announced that they had set up a joint-venture company with Sichuan Blue Sword Beer Group."

With this sentence, the system 10 would apply Rule 1 and note the appearance of two suffixes for the names of organizations, company and group. One of the conditions of Rule 1, is that a proper noun or English text must appear in the sentence prior to the suffix. No English text appears in the sentence, but there are two proper nouns, China and Sichuan Province of China.

An additional requirement of Rule 1 is that a term for time must not be interposed between the possible first term and the suffix of the name of an organization. In the example there are two terms for time, October and ninth. The literal translation for the Chinese words for these terms are respectively tenth month and ninth day. The system 10 would note both month and day as terms for time based on the database 22. Moreover, these terms are both interposed between the proper noun China and the two noted suffixes. Hence, based on Rule 1, the system 10 would eliminate China as a possible first term for either noted suffix.

The other proper noun, though, Sichuan Province of China, appears after both terms for time, and before both of the noted suffixes. Notwithstanding, a further requirement of Rule 1 is that another suffix cannot appear between the possible first term and the suffix for the name of an organization. The system 10 would therefore eliminate the proper noun Sichuan Province of China as a possible first term corresponding to the suffix company.

Based on Rule 1, the proper noun Sichuan Province of China can only be the first term of the name of an organization in this sentence, in correspondence with the suffix group for organization name. Moreover, there are no other terms interposed between this proper noun and suffix that do not meet the requirements of Rule 1. Hence, using Rule 1, the system 10 would be able to distinguish Sichuan Blue Sword Beer Group as the name of an organization in the sentence.

Except for a few differences, Rule 2 is identical to Rule 1. Rule 2 is used to locate the first term of the name of an organization by locating a word or phrase in the text immediately preceding the first term of the name of the organization. For this reason, Rule 2 does not require a proper noun or English text prior to the suffix. Instead, Rule 2 requires text of a type that does not typically form the name of an organization in Chinese prior to the suffix.

Specifically, Rule 2 requires prior to a suffix or organization name, a comma, or a possessive or aspect indicator.

Aspect indicators are characters in Chinese that indicate past tense. The portion of the table in FIG. 4B shows some examples of aspect indicators.

Any of the foregoing is unlikely to form the name of an organization in Chinese. Hence, the presence thereof serves as an indicator tending to indicate that the immediately following term is the beginning of the name of an organization, if it precedes an identified suffix. The remaining conditions imposed by Rule 2, are the same as in Rule 1, and apply to any text thereafter preceding the suffix.

FIG. 7 illustrates a table having a sentence for an example of the application of Rule 2. The example shows the sentence in Chinese, together with a translation in English immediately below the Chinese sentence. Further, the columns below the English translation show a word-by-word translation from Chinese to English, i.e., a literal translation. The example sentence in English is: "Weng Fuliang is a research engineer at the Speech Technology and Research Laboratory of Stanford International Institute."

With this example sentence, the system 10 would recognize two suffixes corresponding to the database 22, institute and laboratory. The system would apply Rule 1 first, which would note that the proper noun Stanford precedes both suffixes in the sentence. Notwithstanding, Rule 1 requires that no other suffix be interposed between a proper noun that is the possible first term for the name of an organization. Pursuant to Rule 1, Stanford could therefore possibly form the first term of the name of an organization having the suffix institute. Moreover, the word international meets the remaining conditions of Rule 1. In accordance with Rule 1, the system 10 would therefore distinguish Stanford International Institute as the name of an organization. (Alternatively, Stanford International Institute may instead be listed in the database 22 as the name of an organization that the system 10 could distinguish without the need for Rule 1).

For the remaining suffix, which is laboratory, based on Rule 1 there is no proper noun or English text in the sentence that could possibly form the first term of the name of an organization ending with the suffix laboratory. The system 10 would thus next apply Rule 2.

Rule 2 is intended for locating a word or character in the text that immediately precedes the first term of the name of the organization, but does not form the name of the organization. One such type of word that meets the requirements of Rule 2 for this purpose is a suffix preceding a noted suffix. In the example of FIG. 7, the suffix institute precedes the suffix laboratory in the sentence. Based on Rule 2, the word immediately following institute could possibly be the first term of the name of an organization ending with the suffix laboratory. Moreover, the words interposed between speech and laboratory meet all of the other requirements of Rule 2. Using Rule 2, the system would therefore distinguish Speech Technology and Research Laboratory as the name of an organization.

Similar to Rule 2, Rule 3 is used to locate the first term of the name of an organization by locating a word or phrase in the text immediately preceding the first term of the name. Hence, Rule 3 requires text of a type that does not typically form the name of an organization in Chinese prior to a noted suffix.

In particular, Rule 3 requires prior to a suffix or organization name, another suffix, the name of an organization, or a conjunctive term used between nouns. The name of an organization would unlikely be formed from two suffixes. Therefore, another suffix preceding the noted suffix is an indicator tending to indicate that immediately following term in the text is the beginning of the name of an organization for the noted suffix.

Likewise the name of an organization preceding a noted suffix could indicate where the name of an organization begins for the noted suffix. In this regard, one or more names of organizations may have been identified by application of the previous rules. In addition, the database 22 includes the names of a few organizations that for identification by the system 10 without applying any of the rules.

Conjunctions used with nouns in Chinese, correspond to words such as "and" or "with" in English. The portion of the table in FIG. 4B illustrates some examples in Chinese of conjunctions for nouns. A conjunction of the type used between nouns could indicate where the name of an organization begins for the noted suffix.

For text immediately following another suffix, the name of an organization, or a conjunction for nouns, Rule 3 imposes the same conditions as Rule 1 for text following a proper noun or English, plus five additional conditions. Specifically, the additional conditions are that the text cannot be (1) a conjunction for nouns, (2) an aspect indicator, (3) a preposition, (4) a counter combined with a number or noun, or (5) the name of an organization. The conditions are intended to eliminate text that would be inconsistent for forming the first part of the name of an organization with the noted suffix.

Prepositions in Chinese correspond to terms in English such as in, of, by, near, with, at, from, and etc. The portion of the table in FIG. 4B further illustrates Chinese words corresponding to prepositions. Counters have been described before. Rule 3 further requires that counters combined with a noun or number not be present, for example, one shop, two of, tens of reporters, first time, and so forth. The portion of the table illustrated in FIG. 4B shows some examples of counters combined with nouns and/or numbers.

Thereafter, Rule 3 allows for the possibility of further text, or no further text, preceding the noted suffix. Further text, however, must meet the same requirements as that required for the preceding text, plus one additional condition. In particular, the further text must not correspond to that of a title normally used for persons, as this usually does not form part of the name for an organization. Titles for persons correspond in English to such terms as Mr., Ms., vice-principal, manager, director, and etc. The portion of the table illustrated in FIG. 4B shows examples of Chinese terms corresponding to titles for persons.

Rule 4, similar to Rules 2 and 3 is used to locate the first term of the name of an organization by locating a word or phrase in the text immediately preceding the first term of the name. In this regard, Rule 4 requires that either a preposition or verb precede a suffix or organization name. Neither a preposition nor a verb often forms the name of an organization. Hence, either a preposition or a verb could indicate that the next word or character is the beginning of the name of an organization.

For text following a verb or a preposition, Rule 4 imposes the same requirements as Rule 2, with four exceptions. In addition to the same requirements as Rule 2, Rule 4 requires that this text additionally not be a conjunction for nouns, the name of another organization, a preposition, or a title for persons.

Rule 5 requires a proper noun in the text preceding a suffix or organization name. Using Rule 5, the system 10 is attempting to identify a proper noun that could form the first term of the name of an organization. For any word or words following the proper noun and prior to the suffix or organization name, Rule 5 has the same requirements as in Rule 4 for text following a verb or preposition with two additional requirements. Namely, this text cannot be an aspect indicator or a bracket. The bracket cannot be any of these, either the opening or closing member: [, (, {, ], ), or }. If these conditions are met, the system 10 concludes that the proper noun is the first word of the name of an organization, which ends with the identified suffix or organization name. Moreover, the name includes a word or words, if any, interposed between the proper noun and the suffix or organization name.

Rule 6 is used to locate the first term of the name of an organization by locating a word or phrase in the text immediately preceding the first term of the name. In particular, Rule 6 requires a verb that is followed by text that is not a conjunction, and then another verb, prior to a suffix or organization name. For text thereafter, Rule 6 has the same requirements as Rule 5, plus two additional conditions. In particular, this text cannot include a counter combined with a noun or number. The portion of the table illustrated in FIG. 4B shows some examples of counters combined with nouns and/or numbers. Further, the text cannot include a conjunction that is used between non-nouns in Chinese, of which the portion of the table illustrated in FIG. 4B shows some examples in Chinese of conjunctions for non-nouns.

For the requirements of Rule 7 to be met, there must be the name of an organization or a phrase that is a noun or some combination thereof. FIGS. 8A and 8B illustrate a table showing some examples of nouns or noun phrases. However, Rule 7 imposes several requirements on the noun phrase. In particular, the text forming the noun phrase must meet the same conditions that Rule 6 imposes for text following the second verb. Following the noun phrase, Rule 7 requires a bracket or no bracket, and then either a suffix or the name of an organization. The bracket cannot be any of these, either the opening or closing member: [, (, {, ], ), or }.

FIG. 9 illustrates a table having a phrase for an example of the application of the foregoing rules, including Rule 7. The example shows the phrase in Chinese, together with a translation in English in the next row of the table. The columns below the English translation show a word-by-word translation from Chinese to English, i.e., a literal translation. The example sentence as translated into English is: "At that time, the Board Chairman and Administrational President of Nescafe (China) Co. Ltd., Mu Li, said that . . . "

With this phrase, the system 10 would first apply Rule 1. Rule 1 requires a proper noun or English text present in the phrase prior to a suffix for the name of an organization (or before the name of an organization). There is one suffix in the phrase, which is Co. Ltd. There is nothing else in the phrase that the system 10 would initially recognize as a suffix or as the name of an organization.

Rule 1 additionally requires a proper noun to be present in the sentence, prior to an identified suffix or name. Based on the database 22, there is only one word in the sentence that the system 10 would recognize as a proper noun, which is the word China. Nescafe might be considered as a proper noun, however, Nescafe is identified in the database 22 as a noun phrase. Therefore, the system 10 would not recognize Nescafe as a proper noun.

With respect to the proper noun China, it appears in the phrase prior to the suffix Co. Ltd. In the phrase in Chinese, a closing parenthesis is interposed between the proper noun, China, and the suffix Co. Ltd. However, a bracket does not violate any conditions imposed by Rule 1 for text interposed between the suffix and a proper noun. Pursuant to Rule 1, the system 10 would therefore determine that "China) Co. Ltd." is the name of an organization in the example phrase.

The system 10 would next apply Rule 2. Rule 2 requires prior to a suffix or organization name, a comma or possessive or aspect indicator. In the example phrase, none of these are present in the example phrase in FIG. 9. Therefore, the system 10 would not make any further determinations based on Rule 2.

Rule 3 requires prior to a suffix or organization name, another suffix, the name of an organization, or a conjunctive term used between nouns. There is nothing in the phrase that meets these requirements. Hence, the system 10 would not make any further determinations based on Rule 3.

Rule 4 requires preceding a suffix or organization name, either a preposition or a verb. There are a couple of verbs present in the phrase. Notwithstanding, neither verb appears in the example phrase prior to a suffix or organization name. Accordingly, the system 10 would not reach any further determination based on Rule 4.

Rule 5 requires a proper noun in the text preceding a suffix or organization name. In this situation, there is a proper noun preceding a suffix. Specifically, the proper noun China precedes the suffix Co. Ltd. However, based on Rule 1, the system 10 previously determined that this suffix should be combined with China and the intervening bracket into the name "China) Co. Ltd." Thus, in applying Rule 5, the system 10 no longer considers Co. Ltd. to be a suffix. Instead, the system 10 will now only consider the combination "China) Co. Ltd." as the name of an organization. Therefore, the system 10 will not make any further determination based on Rule 5 since the conditions of Rule 5 are not met.

Rule 6 requires a verb that is followed by text that is not a conjunction, and then another verb, prior to a suffix or organization name. There are a couple of verbs in the example phrase, but neither verb appears prior to a suffix or an organization name. Consequently, the system 10 does not reach any further determination based on Rule 6.

The system 10 finally applies Rule 7. Rule 7 requires the name of an organization or a phrase that is a noun or some combination thereof, appearing prior to a suffix or organization name. In the example phrase of FIG. 9, the system 10 would identify Nescafe based on the database 22 as a noun or combination thereof. Moreover, Nescafe appears prior to an organization name. In particular, the system 10 determined pursuant to Rule 1 that "China) Co. Ltd." was the name of an organization.

Rule 7 imposes additional conditions on the noun phrase, such as that the noun phrase may not include a bracket. In the example, the noun phrase Nescafe does not include a bracket or parenthesis, although it is followed by an open parenthesis. Nevertheless, Rule 7 permits a parenthesis or no parenthesis to follow the noun phrase. Therefore, the requirements of Rule 7 are met. Based on Rule 7, the system 10 will determine that "Nescafe (China) Co. Ltd." is a name, rather than "China) Co. Ltd."

The database 22 as described herein is intended to include a dictionary or lexicon provided with part-of-speech tagging software. In particular, the system 10 preferably relies to the extent possible upon tagging performed in accordance with presently available part-of-speech tagging software. Hence, the software for the system 10 can rely upon these tags for identifying ordinary parts-of-speech, for example, such as prepositional and conjunctive terms, possessive indicators, aspect markers, pronouns, counters, and etc.

For other parts of speech that the part-of-speech tagging software does not recognize or does not recognize accurately, such as noun phrases, suffixes frequently forming the last terms of the names of organizations in Chinese, the names of some organizations in Chinese, and etc., the database 22 includes additional information as described previously. The additional information may be added to the dictionary or lexicon for the part-of-speech tagging software by tagging such words therein, or another database formed and combined with the dictionary such that the database 22 includes a plurality of sub-databases or is integrated to form one large database.

Modifications, substitutions or other alterations could be made. For example, based on Rule 7 the system is able to distinguish names that include a part of the name between brackets or parenthesis. Therefore, Rule 1 could be modified to additionally require that no bracket or parenthesis appears interposed between the suffix and possible first term and the system 10 should still provide the same results. In addition, more or less rules could be employed by combining or splitting rules. For example, two rules could be substituted for Rule 1, i.e., one rule that searches for proper names and another rule that searches for English text, rather than doing both in Rule 1. In view of the alterations, substitutions and modifications that could be made by one of ordinary skill in the art, it is intended that the scope of letters patent granted hereon be limited only by the definitions of the appended claims.

The embodiments of the invention in which an exclusive property or privilege is claimed are defined as follows:

1. A system for distinguishing a name of an organization in Chinese text, the system comprising:
    a receiving part that receives Chinese text in electronic format;
    an identification part that identifies terms in the received Chinese text that belong to one group of terms that are frequently used to form a first term of a name of an organization, and another group of terms that are frequently used to form a last term of a name of an organization in Chinese;
    a comparing part that compares a location in the Chinese text of the identified term that belongs to the other group to the identified term that belongs to the one group, and if predetermined conditions are met, determines that the identified term that belongs to the other group forms a name of an organization with the identified term that belongs to the one group; and
    an output part that outputs information of at least one of the identified term and the name of the organization.

2. The system of claim 1, wherein the one group of terms includes proper nouns, said identifying a term that belongs to the one group of terms includes identifying English text appearing in the Chinese text, and if predefined conditions are met, determining that the identified term that belongs to the another group forms the name of an organization including the English text.

3. The system of claim 1, wherein one of the predefined conditions is that the identified term that belongs to the other group must appear in the text after the identified term that belongs to the one group.

4. The system of claim 3, wherein the location of the identified term is compared to the other identified term only if both identified terms appear in the same phrase.

5. The system of claim 4, wherein the predefined conditions include that two terms that belong to the other group cannot together form a name of an organization.

6. The system of claim 1, wherein the predefined conditions include a plurality of rules applied in sequential order.

7. The system of claim 1, wherein the identification part defines an indicator that tends to indicate that a term immediately following the identified indicator in the text is the first term of a name of an organization and ending with the identified term that belongs to the other group.

8. A process for distinguishing a name of an organization appearing in a phrase or sentence in Chinese, the process comprising:
    (a) establishing data including at least one group of terms comprising indicators that tend to indicate that a term immediately following an indicator is a first term of a name and of an organization, and another group of terms comprising terms frequently used to form a last term of a name of an organization in Chinese;
    (b) identifying in the Chinese phrase or sentence terms corresponding to the data;
    (c) comparing a location in the Chinese text of the identified term that belongs to the other group to the identified term that belongs to the one group, and if predefined conditions are met, determining that the identified term that belongs to the other group forms the name of an organization together with text immediately following, but not including, the identified term that belongs to the one group;
    (d) outputting information of at least one of the identified term and the name of the organization.

9. The process of claim 8, further comprising identifying English text appearing in the Chinese phrase or sentence, comparing the location of the identified term that belongs to the other group to the identified English text, and if predefined conditions are met, determining that the identified term that belongs to the other group forms the name of an organization including English text.

10. The process of claim 8, wherein one of the predefined conditions is that the identified term that belongs to the other group must appear in the text after the identified term that belongs to the one group.

11. The process of claim 8, wherein the predefined conditions include that two terms that belong to the other group cannot together form the name of an organization.

12. The process of claim 8, further comprising identifying a proper noun in the text, comparing the location in the text of the identified term that belongs to the other group to the identified proper noun, and if predefined conditions are met, determining that the identified term that belongs to the other group forms a name of an organization with the identified proper noun.

13. The process of claim 12, wherein said identifying a proper noun in the text and comparing the location of the identified term that belongs to the other group to the identified proper noun is performed prior to said comparing the location of the identified term that belongs to the other group to the identified term that belongs to the one group.

14. The process of claim 8, wherein the indicators include a comma or a possessive or aspect indicator in Chinese.

15. A storage medium readable by a computer, the storage medium storing a program of instructions executable by the computer to perform a function for distinguishing a name of an organization in a phrase or sentence in Chinese input to the computer, the function comprising:
    receiving Chinese text in electronic format;
    identifying terms in the received Chinese text that belong to one group of terms that are frequently used to form a first term of a name of an organization, and another group of terms that are frequently used to form a last term of a name of an organization in Chinese;
    comparing a location in the Chinese text of the identified term that belongs to the other group to the identified term that belongs to the one group;

if predetermined conditions are met, determining that the identified term that belongs to the other group forms a name of an organization with the identified term that belongs to the one group; and outputting information of at least one of the identified term and the name of the organization.

16. The storage medium of claim 15, wherein the function further comprises identifying English text appearing in the Chinese phrase or sentence, comparing a location of the identified term that belongs to the other group to the identified English text, and if predefined conditions are met, determining that the identified term that belongs to the other group forms a name of an organization including English text.

17. The storage medium of claim 15, wherein one of the predefined conditions is that the identified term that belongs to the other group must appear in the text after the identified term that belongs to the one group.

18. The storage medium of claim 15, wherein the predefined conditions include that two terms that belong to the other group cannot together form a name of an organization.

19. The storage medium of claim 15, wherein the function further comprises identifying an indicator that tends to indicate that a term immediately following an identified indicator in a phrase or sentence in Chinese is the first term of the name of an organization.

20. The storage medium of claim 15, wherein identifying an indicator is performed after said comparing, and said indicator includes any name of an organization determined in said comparing and appearing in the phrase or sentence prior to an identified term that belongs to the other group which has not been determined to form the name of an organization in said comparing.

21. A method for distinguishing a name of an organization in a phrase or sentence in Chinese input to a computer, the method comprising:

receiving Chinese text in electronic format;

identifying terms in the received Chinese text that belong to one group of terms that are frequently used to form a first term of a name of an organization, and another group of terms that are frequently used to form a last term of a name of an organization in Chinese;

if predefined conditions are met, determining that the identified term that belongs to the other group forms a name of an organization with the identified term that belongs to the one group; and outputting information of at least one of the identification term and the name of the organization.

* * * * *